United States Patent
Eryurtlu

(10) Patent No.: US 6,977,961 B1
(45) Date of Patent: Dec. 20, 2005

(54) METHOD AND APPARATUS FOR MACROBLOCK DC AND AC COEFFICIENT PREDICTION FOR VIDEO CODING

(75) Inventor: Faruk Mehmet Omer Eryurtlu, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/069,687

(22) PCT Filed: May 15, 2000

(86) PCT No.: PCT/GB00/01842

§ 371 (c)(1),
(2), (4) Date: Feb. 22, 2002

(87) PCT Pub. No.: WO01/17266

PCT Pub. Date: Mar. 8, 2001

(30) Foreign Application Priority Data

Aug. 31, 1999 (EP) .................................. 99306931

(51) Int. Cl.[7] ............................................. H04N 7/12
(52) U.S. Cl. ............................................. 375/240.02
(58) Field of Search .......................... 375/240, 240.02, 375/240.12, 240.13, 240.24, 240.2; 348/394.1, 348/395.1, 403.1, 404.1, 421.1; 382/239, 382/250, 251, 253; H04N 7/12

(56) References Cited

U.S. PATENT DOCUMENTS

| | | | | |
|---|---|---|---|---|
| 5,838,831 A | * | 11/1998 | de Queiroz | 382/248 |
| 5,854,857 A | * | 12/1998 | de Queiroz et al. | 382/232 |
| 6,088,392 A | * | 7/2000 | Rosenberg | 375/240.03 |
| 6,272,251 B1 | * | 8/2001 | de Queiroz et al. | 382/232 |
| 6,282,322 B1 | * | 8/2001 | Rackett | 382/248 |
| 6,285,774 B1 | * | 9/2001 | Schumann et al. | 382/100 |
| 6,385,249 B1 | * | 5/2002 | Kondo et al. | 375/240.27 |

FOREIGN PATENT DOCUMENTS

| | | | | |
|---|---|---|---|---|
| EP | 0 454 927 A2 | 12/1990 | | H04N 7/13 |
| EP | 0 454 927 A3 | 12/1990 | | H04N 7/13 |
| EP | 0 577 363 A1 | 6/1993 | | H04N 7/13 |
| EP | 0 577 428 A2 | 7/1993 | | H04N 7/13 |
| EP | 0 577 428 A3 | 7/1993 | | H04N 7/13 |
| EP | 0 801 506 A2 | 10/1997 | | H04N 7/30 |
| EP | 0 863 673 A2 | 9/1998 | | H04N 7/50 |

* cited by examiner

OTHER PUBLICATIONS

Uuji Izawa et al, Improvement of Picture Quality and Coding Efficiency Using DCT, Jun. 1990, Electronics and Communication In Japan, No. 6, Part I, New York, pp. 12-21.*

*Primary Examiner*—Nhon Diep

(57) ABSTRACT

Existing video data compression algorithms exploit the fact that the DCT coefficients in the neighbouring blocks are sometimes similar to those in the current block. This means that if the blocks contain completely different coefficients, for coding video data is disclosed in which element in a prediction matrix is set to an initial prediction value. In the prediction matrix, a smoothing transform is applied to the values along the rows and then along the columns, or vice versa, to obtain interpolated values. The prediction value is reset to the interpolated value and the difference between the reset prediction values and corresponding received pixel values is calculated to produce a residual prediction matrix containing the prediction residuals. A discrete cosine transform is performed on the prediction residuals to obtain elements of a compressed video data matrix. The processor means is preferably arranged iteratively to calculate the reset prediction value used to calculate the prediction residual by repeating steps b) and c).

16 Claims, 5 Drawing Sheets

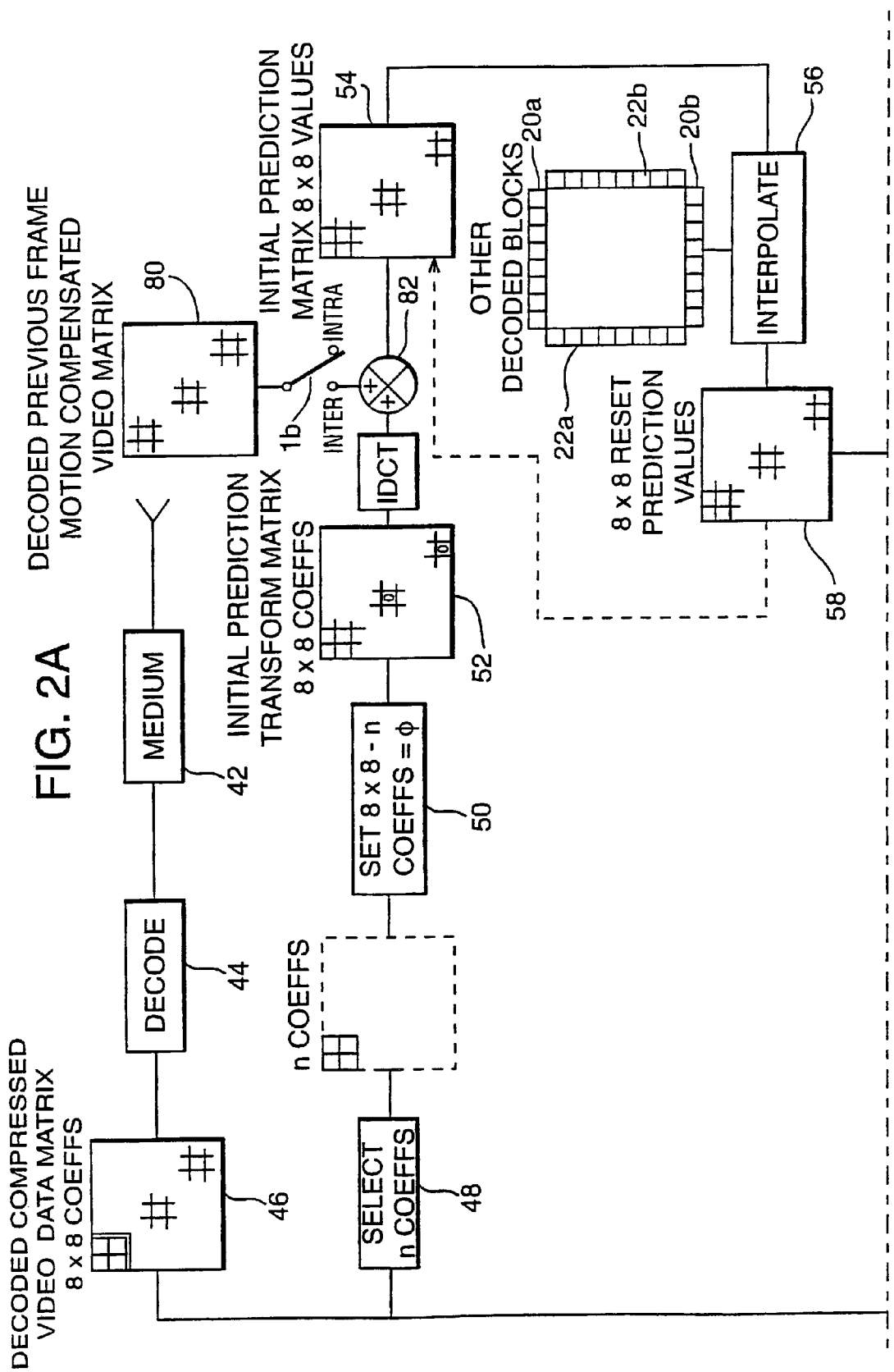

Figure 1:
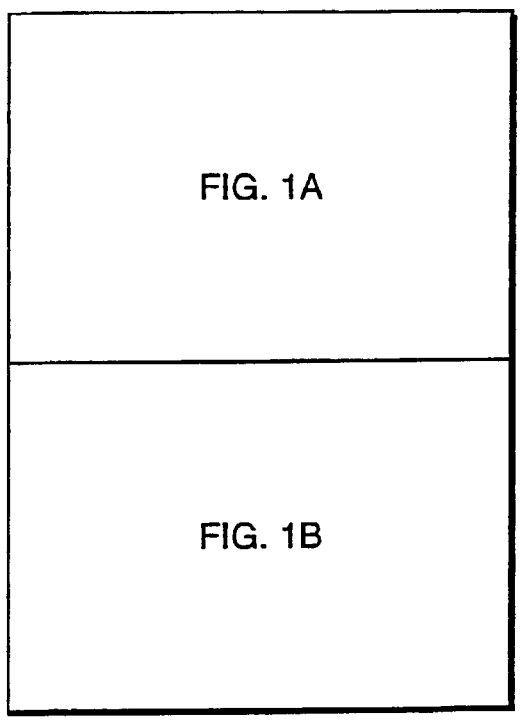

METHOD AND APPARATUS FOR MACROBLOCK DC AND AC COEFFICIENT PREDICTION FOR VIDEO CODING

This invention relates to apparatus for compressing and expanding video data.

Existing video compression standards are all based on block discrete cosine transform (DCT) transform. The picture is divided into square blocks consisting of 8×8 pixels. The blocks may contain the actual pixels or the prediction residual, which is the difference between the actual and motion compensated bock pixels. Each block is transformed into DCT domain, which results in 8×8 coefficients.

The DCT process is used to remove the spatial redundancy between the pixels in the same block. However, it does not consider the redundancy between the pixels from different blocks. The first versions of the standards did not use any technique to exploit the correlation between different blocks. Recently, MPEG-4 and H.263+ have added tools/options to exploit this redundancy to certain extent. At present, MPEG-4 predicts the DC coefficient (first coefficient, which is actually the block average) of the current block by using the DC coefficients of the neighbouring blocks. H.263+ does this, and in addition, it also predicts the first row or column of the DCT coefficients in some cases if there is any benefit.

In brief, existing compression algorithms exploit the fact that the DCT coefficients in the neighbouring blocks are sometimes similar to those in the current block. This means that if the blocks contain completely different coefficients, the prediction will not work.

Yuuji Izawa Et Al: 'Improvement of Picture Quality and Coding Efficiency Using Discrete Cosine Transform' Electronics & Communications in Japan, Part 1—Communications, US, Scripta Technica, New York, vol. 73, no. 6, 1 Jun. 1990 (1990-06-01), pages 12–21, XP000170744 ISSN: 8756–6621 discloses apparatus for coding video data, comprising means for receiving pixel values organised in frames each comprising a matrix of video blocks, each video block comprising a video matrix of N pixel values, and processor means arranged to perform the following steps:

a) to set each element in a prediction matrix to an initial prediction value;
b) in the prediction matrix, to apply a smoothing transform to the values along rows and then along columns, or vice versa, to obtain interpolated values;
c) to set the prediction values to the interpolated values;
d) to calculate the differences between the prediction values and corresponding received pixel values to produce a residual prediction matrix containing prediction residuals.

The present invention is characterised over the disclosure of the Yuuji Izawa et al. paper mentioned above in that the processor means is also arranged e) to perform a discrete cosine transform on the prediction residuals to obtain elements of a compressed video data matrix, wherein the processor means is arranged iteratively to calculate the prediction values used to calculate the prediction residuals by repeating steps b) and c.

The number of iterations may be predetermined or, in an alternative, the iterations may be repeated until the change in the prediction value between one iteration and the next, is less than a predetermined threshold.

Step a) is most preferably performed by performing a discrete cosine transform on the video matrix to obtain a transform video matrix of N coefficients, selecting n of the coefficients, setting the N-n remaining coefficients to zero to obtain an initial prediction transform matrix of initial prediction coefficients, and performing an inverse discrete cosine transform on the initial prediction transform matrix to obtain a matrix of N initial prediction values.

In that case, the processor is preferably arranged to set n of the elements in the compressed video data matrix equal to the n coefficients selected from the transform video matrix, and to select the remaining N-n coefficients from the prediction residuals.

The processor is further preferably arranged to adjust the prediction residuals before selecting the remaining N-n elements, by:

f) performing a discrete cosine transform on the reset prediction value matrix to obtain a prediction transform matrix,
g) selecting n coefficients from the transform prediction matrix,
g) selecting n coefficients from the transform prediction matrix,
h) subtracting the selected n transform prediction matrix coefficients from the selected n transform video coefficients to obtain n residual coefficients;
i) setting n elements of an adjustment transform matrix to the values of the n residual coefficients and setting N-n remaining elements to zero;
j) performing an inverse discrete cosine transform on the adjustment transform matrix to obtain an adjustment value matrix; and
k) subtracting the adjustment value matrix from the reset prediction value matrix.

The apparatus may include means for processing pixels in a current and a previous frame to produce pixel values which are the prediction residual between the actual pixel and a motion compensated pixel.

The invention extends to apparatus for expanding video data compressed by apparatus as claimed in any preceding claim, comprising means for receiving the compressed video matrix, and processor means arranged to perform the following steps:

a) to perform an inverse discrete cosine transform on received compressed video data to obtain a prediction residual matrix;
b) to set each element in a prediction matrix to the initial prediction value;
c) in the prediction matrix, to apply a smoothing transform to the values along the rows and then along the columns, or vice versa, to obtain interpolated values;
d) to reset the prediction value to the interpolated value; and
e) to calculate the sum of the reset prediction values and the prediction residual in corresponding positions in the received coded block matrix to produce an expanded video data matrix.

Figure 2:
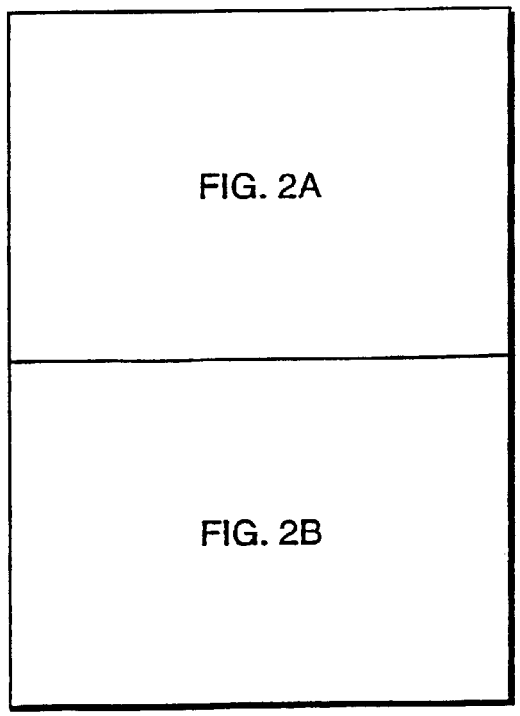
Figure 1A:
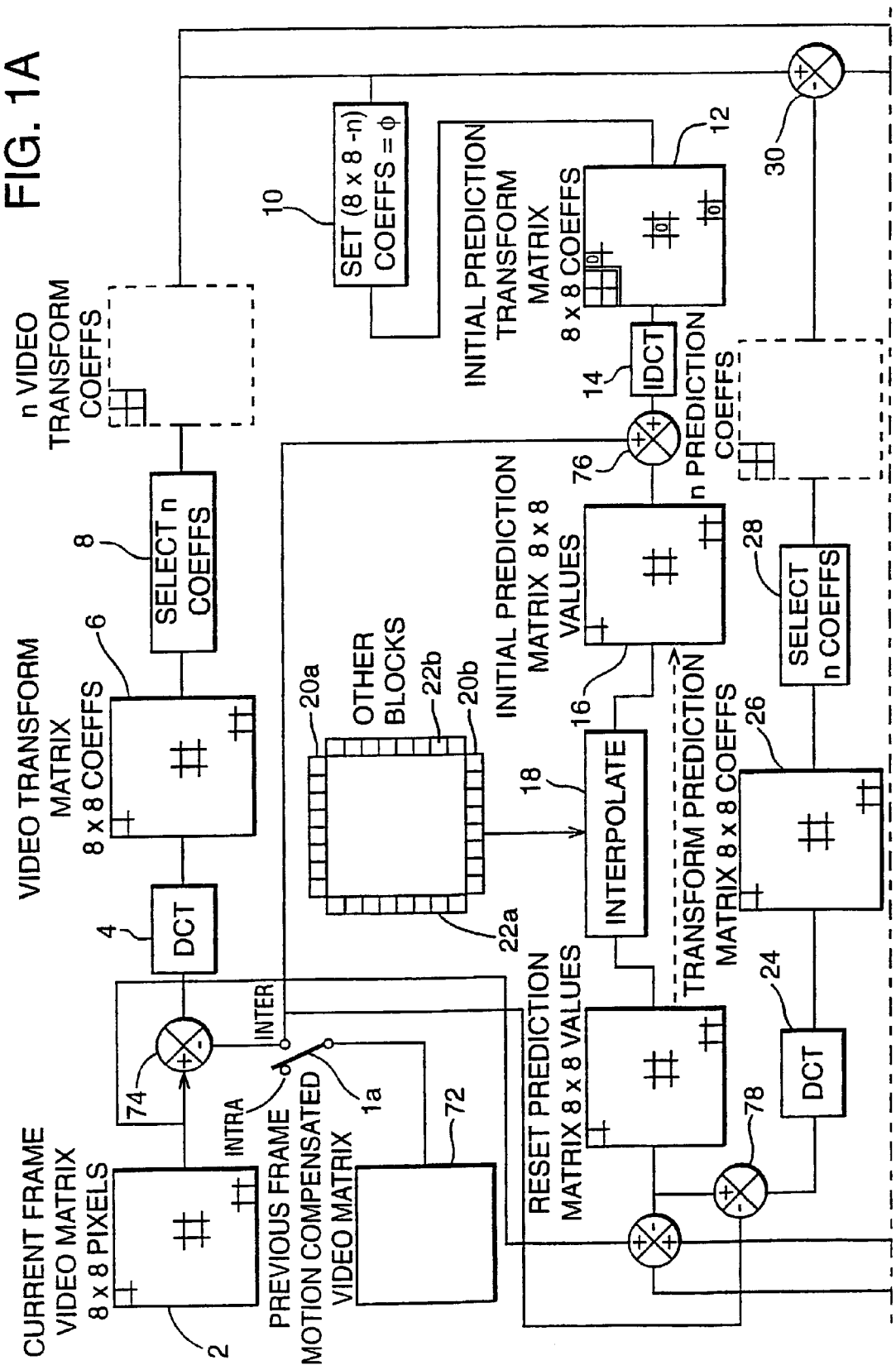
Figure 1B:
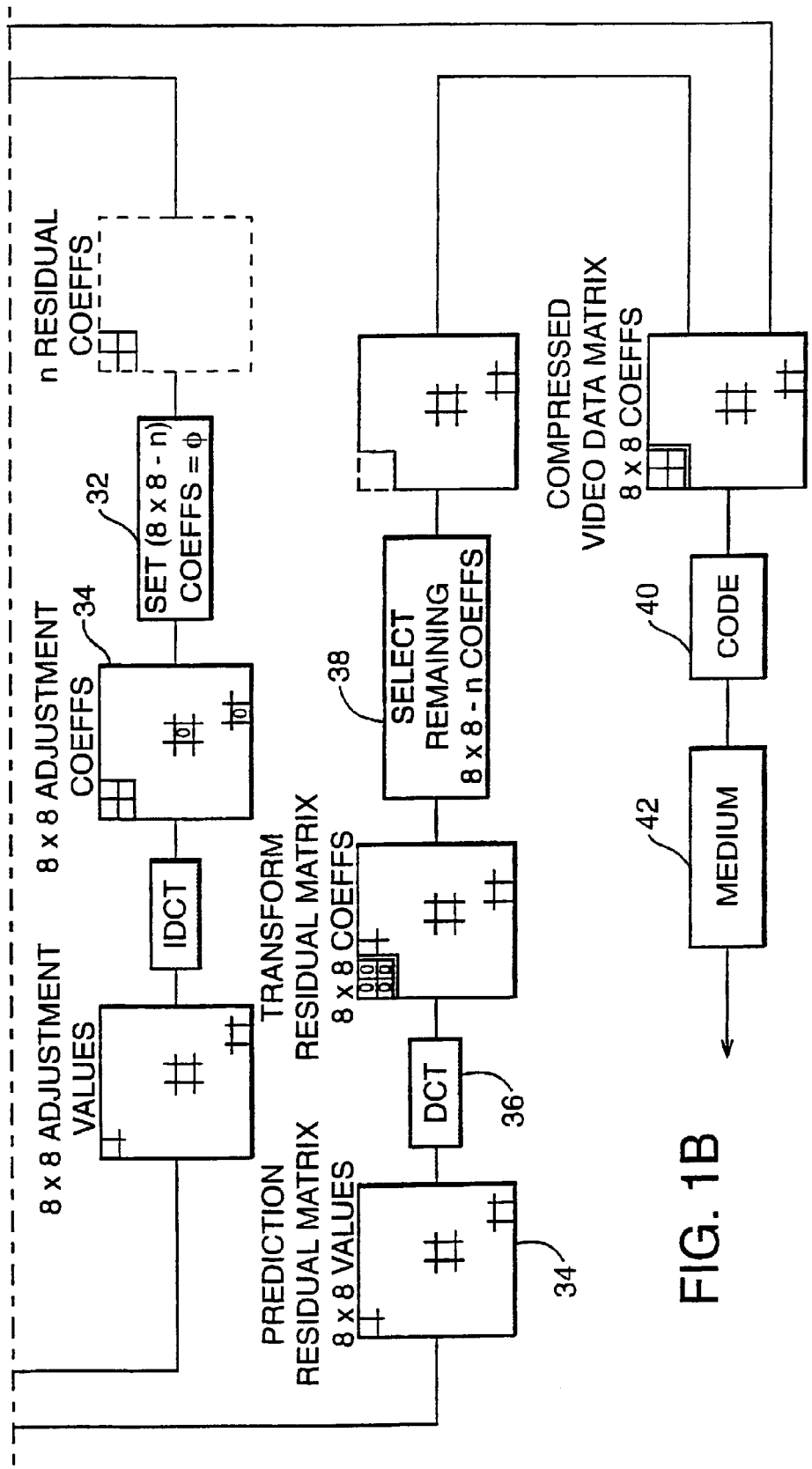
Figure 2B:
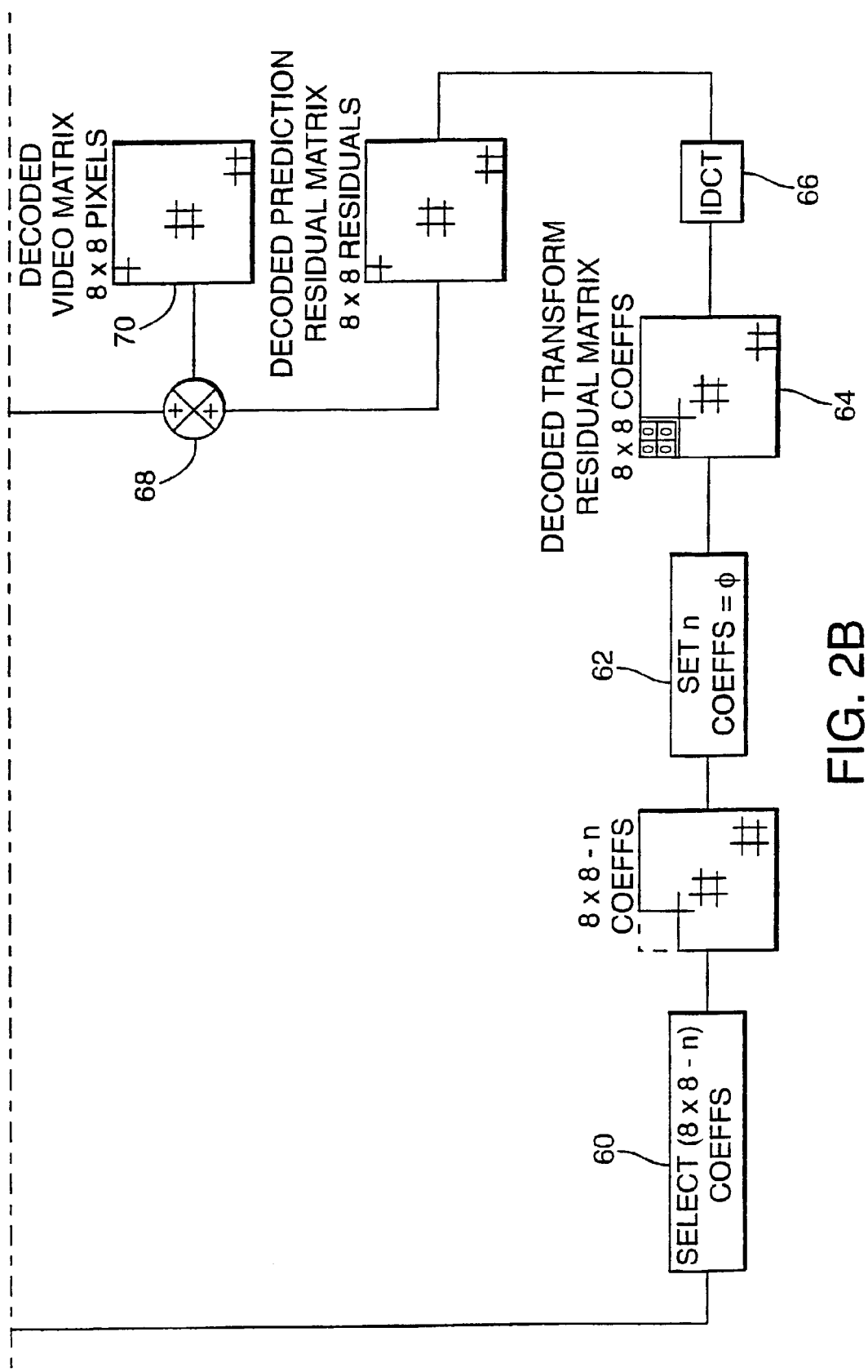

Embodiments of the invention will now be described, by way of example, with reference to the accompanying drawings in which:

FIGS. 1A and 1B, when assembled as shown in FIG. 1, show a block diagram of a transmitter including apparatus for compressing video data embodying the invention; and FIGS. 2A and 2B, when assembled as shown in FIG. 2, show a block diagram of a receiver including apparatus for expanding the video data compressed by the apparatus of FIG. 1.

A frame of quantised and digitised pixel values is divided into video matrices comprising blocks of N pixels where as an example N=8×8. With a switches 1a, 1b set to "intra" as illustrated, a video matrix 2 is discrete cosine transformed in step 4 to produce a video transform matrix 6 comprising a block of N discrete cosine transform (DCT) coefficients where in the example N=8×8. Of these a square of n coefficients are selected in step 8, essentially the DC coefficient and optionally other coefficients.

In step 10, the remaining N-n (i.e. 8×8-n) coefficients are set to zero to obtain an initial prediction transform matrix 12. The coefficients are inverse discrete cosine transformed in step 14 to obtain an initial prediction matrix 16.

In step 18 interpolation is performed between the initial prediction values of matrix 16 and the values in the neighbouring preceding blocks to reset the prediction matrix. Values in a row 20, spatially nearest to the video matrix 2, are used in the interpolation process. Linear interpolation is performed between the value in a row/column position in the initial prediction matrix and the value in a corresponding column in row 20 weighted according to the distance in rows from the row 20.

Similarly values in a column 22, spatially nearest the video matrix 2, are used in the interpolation process. Linear interpolation is also performed between the value in a row/column position in the initial prediction matrix and the value in a corresponding row in column 22, weighted by the distance in columns from the column 22.

$$V_{interpolated} = \{1V_{r,c} + V_{20,c}/r + V_{r,22}/C\}^{1/4}$$

Where, $V_{interpolated}$ is the interpolated prediction value, $V_{r,c}$ is the value at row r column c of the initial prediction matrix 16, $V_{20,c}$ is the value in column c of row 20, r is the distance in rows of the position r,c from row 20, $V_{r,22}$ is the value at row r in column 22, and c is the distance in columns of the position r,c from the column 22.

The interpolation step 18 is performed iteratively until, in one example, the change in values in one step is less than a predetermined threshold. In another example, a predetermined fixed number of iterations is performed.

When the iterations are complete, the reset prediction values are discrete cosine transformed in step 24 to obtain 8×8 coefficients of a transform prediction matrix 26. In step 28 n coefficients are selected and, in step 30 subtracted from the n video transform coefficients previously selected in step 8 to produce n residual coefficients. In step 32 the remaining 8×8-n coefficients are set to zero to obtain 8×8 adjustment coefficients 34. These are inverse discrete cosine transformed to produce 8×8 adjustment values.

The values of the reset prediction matrix are adjusted by subtracting from them the adjustment values. The values in the video matrix are subtracted from the adjusted reset prediction values to obtain a prediction residual matrix 34 of 8×8 values. In step 36, the prediction residual values are discrete cosine transformed to produce a transform residual matrix having 8×8 coefficients. Of these n will be zero because of the adjustment made to the reset prediction matrix.

The remaining 8×8-n coefficients are selected in step 38 and assembled with the n video transform coefficients previously selected in step 8 to provide a compressed video matrix of 8×8 coefficients. These are channel coded in step 40 and transmitted through a medium 42.

In the apparatus shown in FIGS. 2A and 2B, the signal received from the medium 42 is channel decoded in step 44 to produce a decoded compressed video data matrix 46 of 8×8 coefficients. Of these, n are selected in step 48 and the remaining 8×8-n are set to zero in step 50 to obtain a decoded initial prediction transform matrix 52 having 8×8 coefficients. The coefficients are inverse discrete cosine transformed to produce a+ decoded initial prediction matrix 54 having 8×8 initial prediction values.

In step 56, interpolation is performed iteratively on the initial prediction matrix in exactly the same manner as was performed in step 18 on the prediction matrix 16 using the (decoded) neighbouring row 20 and column 22 to obtain a matrix 58 of reset prediction values.

In step 60, the remaining 8×8-n coefficients of matrix 46 are selected and n coefficients are set to zero in step 62 to obtain a decoded transform residual matrix 64 having 8×8 coefficients. These coefficients are inverse discrete cosine transformed in step 66 to obtain a decoded prediction residual matrix having 8×8 residual values. In step 68 these are added to the reset prediction values in matrix 58 to produce a decoded video matrix 70 containing 8×8 pixel values corresponding to those of matrix 2.

Putting the switches 1a, 1b in their "inter" position, rearranges the apparatus to operate not on the current frame video matrix, but on the residual produced by subtracting the values in a motion compensated block of a previous frame, from the values in the current frame video matrix 2 in step 74. The motion compensated values are added back in step 76 to produce the initial prediction matrix 16 values, and subtracted in step 78 from the reset prediction values.

In the expander shown in FIG. 2, motion compensated values obtained in a decoded motion compensated video matrix 80 from a previously decoded frame, are added back in step 82 to produce the initial prediction matrix.

What is claimed is:

1. Apparatus for coding video data, comprising means for receiving pixel values organised in frames each comprising a matrix of video blocks, each video block comprising a video matrix of N pixel values, and processor circuitry arranged:
   a) to set each element in a prediction matrix to an initial prediction value;
   b) in the prediction matrix, to apply a smoothing transform to the values along rows and then along columns, or vice versa, to obtain interpolated values;
   c) to set the prediction values to the interpolated values;
   d) to calculate the differences between the prediction values and corresponding received pixel values to produce a residual prediction matrix containing prediction residuals; and
   e) to perform a discrete cosine transform on the prediction residuals to obtain elements of a compressed video data matrix, wherein the processor circuitry is arranged iteratively to calculate the prediction values used to calculate the prediction residuals by repeating b) and c); and
   wherein a) is performed by performing a discrete cosine transform on the video matrix to obtain a transform video matrix of N coefficients, selecting n of the coefficients, setting the N-n remaining coefficients to zero to obtain an initial prediction transform matrix of initial prediction coefficients, and performing an inverse discrete cosine transform on the initial prediction transform matrix to obtain a matrix of N initial prediction values.

2. Apparatus as claimed in claim 1, wherein the number of iterations is predetermined.

3. Apparatus as claimed in claim 1, wherein the processor circuitry is arranged to repeat the iterations until the change in a prediction value between one iteration and the next, is less than a predetermined threshold.

4. Apparatus as claimed in claim 1, wherein the processor is arranged to set n of the elements in the compressed video data matrix equal to the n coefficients selected from the transform video matrix, and to select the remaining N-n coefficients from the prediction residuals.

5. Apparatus as claimed in claim 4, wherein the processor is arranged to adjust the prediction residuals before selecting the remaining N-n elements, by:
   f) performing a discrete cosine transform on the reset prediction value matrix to obtain a prediction transform matrix,
   g) selecting n coefficients from the transform prediction matrix,
   h) subtracting the selected n transform prediction matrix coefficients from the selected n transform video coefficients to obtain n residual coefficients;
   i) setting n elements of an adjustment transform matrix to the values of the n residual coefficients and setting N-n remaining elements to zero;
   j) performing an inverse discrete cosine transform on the adjustment transform matrix to obtain an adjustment value matrix; and
   k) subtracting the adjustment value matrix from the reset prediction value matrix.

6. Apparatus as claimed in claim 1, including means for processing pixels in a current and a previous frame to produce pixel values which are the prediction residual between the actual pixel and a motion compensated pixel.

7. Apparatus for expanding compressed video data, comprising processor circuitry arranged:
   a) to perform an inverse discrete cosine transform on received compressed video data to obtain a prediction residual matrix;
   b) to set each element in a prediction block matrix to the initial prediction value;
   c) in the prediction matrix, to apply a smoothing transform to the values along rows and then along columns, or vice versa, to obtain interpolated values;
   d) to set the prediction values to the interpolated values; and
   e) to calculate the sum of the prediction values and the prediction residuals in corresponding positions in the received coded block matrix to produce an expanded video data matrix, wherein the processor circuitry is arranged iteratively to calculate the prediction values used to calculate the prediction residuals by repeating c) and d); and
   wherein a) is performed by performing a discrete cosine transform on the video matrix to obtain a transform video matrix of N coefficients, selecting n of the coefficients, setting the N-n remaining coefficients to zero to obtain an initial prediction transform matrix of initial prediction coefficients, and performing an inverse discrete cosine transform on the initial prediction transform matrix to obtain a matrix of N initial prediction values.

8. Apparatus as claimed in claim 7, wherein the number of iterations is predetermined.

9. Apparatus as claimed in claim 4, wherein the processor circuitry is arranged to repeat the iterations until the change in the prediction value between one iteration and the next, is less than a predetermined threshold.

10. Apparatus as claimed in claim 7 for expanding compressed video data, wherein the processor is arranged to select N-n elements from the compressed video data matrix and to set n elements to zero before performing the inverse discrete cosine transform to obtain the prediction residual matrix.

11. Apparatus for coding video data adapted to receive pixel values organised in frames each comprising a matrix of video blocks, each video block comprising a video matrix of N pixel values, and processor circuitry arranged:
   a) to set each element in a prediction matrix to an initial prediction value;
   b) in the prediction matrix, to apply a smoothing transform to the values along the rows and then along the columns, or vice versa, to obtain interpolated values;
   c) to reset the prediction value to the interpolated value;
   d) to calculate the difference between the reset prediction values and corresponding received pixel values to produce a residual prediction matrix containing the prediction residuals; and
   e) to perform a discrete cosine transform on the prediction residuals to obtain elements of a compressed video data matrix, wherein a) is performed by performing a discrete cosine transform on the video matrix to obtain a transform video matrix of N coefficients, selecting n of the coefficients, setting the N-n remaining coefficients to zero to obtain an initial prediction transform matrix of initial prediction coefficients, and performing an inverse discrete cosine transform on the initial prediction transform matrix to obtain a matrix of N initial prediction values.

12. Apparatus as claimed in claim 11, wherein the processor circuitry is arranged iteratively to calculate the reset prediction value used to calculate the prediction residual by repeating b) and c).

13. Apparatus as claimed in claim 11, including means for processing pixels in a current and a previous frame to produce pixel values which are the prediction residual between the actual pixel and a motion compensated pixel.

14. Apparatus for expanding compressed video data, comprising processor circuitry arranged:
   a) to perform an inverse discrete cosine transform on received compressed video data to obtain a prediction residual matrix;
   b) to set each element in a prediction block matrix to the initial prediction value;
   c) in the prediction matrix, to apply a smoothing transform to the values along the rows and then along the columns, or vice versa, to obtain interpolated values;
   d) to reset the prediction value to the interpolated value; and
   e) to calculate the sum of the reset prediction values and the prediction residual in corresponding positions in the received coded block matrix to produce an expanded video data matrix, wherein a) is performed by performing a discrete cosine transform on the video matrix to obtain a transform video matrix of N coefficients, selecting n of the coefficients, setting the N-n remaining coefficients to zero to obtain an initial prediction transform matrix of initial prediction coefficients, and performing an inverse discrete cosine transform on the initial prediction transform matrix to obtain a matrix of N initial prediction values.

15. Apparatus as claimed in claim 14, wherein the processor circuitry is arranged iteratively to calculate the reset prediction value used to calculate the prediction residual by repeating c) and d).

16. Apparatus as claimed in claim 14 for expanding compressed video data, wherein the processor is arranged to select N-n elements from the compressed video data matrix and to set n elements to zero before performing the inverse discrete cosine transform to obtain the prediction residual matrix.

* * * * *